United States Patent [19]

Rosenberg et al.

[11] Patent Number: 5,237,359
[45] Date of Patent: Aug. 17, 1993

[54] STORAGE FOR STRIP MATERIAL

[75] Inventors: Roman Rosenberg, Zurich; Heiner Schaub, Wettingen, both of Switzerland

[73] Assignee: Gretag Systems, Inc., Bothell, Wash.

[21] Appl. No.: 896,600

[22] Filed: Jun. 10, 1992

[30] Foreign Application Priority Data

Jun. 19, 1991 [EP] European Pat. Off. .......... 91810472

[51] Int. Cl.$^5$ ............................................. G03D 3/08
[52] U.S. Cl. .................................... 354/319; 354/322; 355/27; 355/28
[58] Field of Search ........................ 355/27, 28, 77, 29; 354/319, 320; 226/118, 119

[56] References Cited

U.S. PATENT DOCUMENTS 4,136,946  1/1979  Nishimoto .............................. 355/28
4,782,354  11/1988  Gregoris .............................. 354/322
4,930,672  6/1990  Renzo .................................. 226/119

FOREIGN PATENT DOCUMENTS 2551304  5/1977  Fed. Rep. of Germany .
57-016441  3/1982  Japan .

Primary Examiner—D. Rutledge
Attorney, Agent, or Firm—Burns, Doane, Swecker & Mathis

[57] ABSTRACT

A storage for strip material is provided with an inlet for the strip material into the internal space of the housing and an outlet from the internal space of the housing. Inside the housing, holding means are provided which accumulate the strip material above the holding means where the weight of the strip material is less than a threshold value, and which release the strip material downward if the weight of the strip material exceeds the threshold value.

21 Claims, 10 Drawing Sheets

STORAGE FOR STRIP MATERIAL

BACKGROUND OF THE INVENTION

The invention relates to storage of strip material and to an apparatus for the processing of strip material, together with a photographic processing line.

Storage devices for strip material are being used at the present time in numerous different configurations and fields of application. An example of such a field of application is in photographic processing lines comprising a plurality of different processing stations. In such a processing line, initially the negative films are developed in a film developing station. In a subsequent copy machine, the so-called "printer", the negative films are copied onto a strip of a photosensitive photographic paper. The copy station is followed by a paper developing station, the so-called "wet part" in which the exposed paper is subjected to a wet chemical treatment and thus developed. Finally, in a subsequent terminal processing station the developed paper strip is cut into individual paper images and sorted. The negative films are cut into strips and subsequently the components belonging to a customer order (i.e., negative films and processed paper images) are packed into an inner pocket. The inner pocket is placed into the appropriate customer order packet, which then is returned to the customer or the agency transmitting the order.

Such a photographic processing line is described for example in U.S. Pat. No. 4,782,354. Because the individual processing stations in photographic processing lines usually operate independently of each other and the processing velocity of the individual stations may vary as the result of various effects, buffer storage devices are often inserted between the individual processing stations. The buffer storage devices are capable of intermediately storing the strip material to be processed, thereby compensating for fluctuations in the processing velocity of each station. For example, the exposure of the photosensitive paper strips in the printer may at times take place at a higher rate than the processing of the exposed strips in the wet part. If there is no intermediate storage device between the two stations, the printer would have to remain idle until the wet part is again able to process the paper. On the other hand, if the exposure of the paper strips in the printer occurs slower than the processing of the paper in the wet part, the latter would have to be idled until exposed paper is again supplied by the printer. This, however, must be avoided in the processing line, as the period of time during which the paper is exposed to the chemicals in the wet part must always be the same for a given paper, or otherwise the images could be destroyed.

A possible configuration of a photographic processing line having an intermediate storage to avoid such problems, is described in the aforementioned U.S. Pat. No. 4,782,354. A storage device described therein includes a frame, to which in a first plane a first support platform is stationarily fastened. A second support platform is provided in a second plane on said frame. The plane of the second support platform is parallel to the plane of the first platform. However, in contrast to the first support platform, the second support platform can slide in a manner such that while it always remains parallel to first support platform, it may be displaced, or moved toward or away from the first platform.

A plurality of rollers are connected with each support platform, with the rotating axles of the rollers extending parallel to the plane of the support platform involved. The paper is guided in a serpentine-like fashion over the rollers. To ensure a secure, tensioned guidance of the strip material over the rollers, but primarily to be able to equalize the aforementioned fluctuations of the working velocity of successive stations, reset springs are provided. The reset springs move the mobile support platform, together with the rollers mounted on it, in case of a variation in the operating velocity of a station. The reset springs move the mobile support platform toward or away from the stationary platform, depending on the nature of the variation (acceleration or slowing), so that on the one hand the strip material is always guided through the storage device in a secure and tensioned manner, and so that on the other hand none of the stations needs to be stopped to equalize fluctuations of the working rate.

A storage device of this type has several disadvantages. Firstly, the "inner life", or inner configuration, of the device is relatively complex, translating into an extensive production effort and thus high costs for the device. Furthermore, the threading of the strip material is very difficult and requires a considerable effort, again in view of the complex "inner life" of the device. Even if it is desired to avoid rethreading the strip material after a stoppage of the line (for example overnight), the aforementioned great effort is still required. That is, to avoid rethreading of the strip material to be processed upon the resumption of the operation, a so-called "blind strip" must run through the line until it is threaded through all of the storage devices (the strip material is attached to the blind strip). However, after the discontinuation of the operation (for example in the evening if the line is to be idled overnight), the line must run until the blind strip is passed completely through the storage device, which involves the loss of time. Other highly significant disadvantages of such a storage device is the enormous space it requires, together with its relatively low holding capacity. In the case where the receiving capacity for the strip material is to be very large, the storage device is extremely bulky and requires much space. This also poses large space requirements relative to the room in which the processing line is to be housed, which is especially disadvantageous in the development of space saving processing plants. Another storage device with similar disadvantages is described in U.S. Pat. No. 4,930,672.

SUMMARY OF THE INVENTION

It is therefore an object of the invention to provide a space saving storage device for strip material, which also has a high receiving capacity. In addition, a configuration of the device should be as simple as possible (simple "inner life"). It is further advantageous to render the threading of the strip material as simple as possible.

These and other objects are attained according to the invention by a storage means wherein holding means accumulate strip material entering a housing of the storage means located above said holding means when the weight of the incoming strip material is less than a certain threshold value. If the weight of the strip material accumulated exceeds said threshold value, the holding means releases the strip downward. The "inner life" of the storage means is thus very simple and may be manufactured cost effectively. The space requirements of such a storage are considerably less than those of the aforedescribed conventional storage device, which is particularly advantageous in the case of space saving processing lines.

In order to utilize the internal space of the housing as effectively as possible, the holding means of an exemplary embodiment is designed and laid out to define a plurality of holding levels located below each other in an operating position, upon which the strip material accumulates, until the weight of the strip material exceeds the threshold value for the level involved. Then the strip material is released to the next level under it. The holding means represented by this next holding level then again accumulates the strip material released by the level above it until the threshold value is exceeded, and so on. Particularly in the case where exposed photographic paper is the strip material, pressure exposures or scratching of the surfaces (images) due to the weight of the remaining photographic paper resting on the lowest paper strip are avoided, as the threshold value at the lowest holding level permits only one length or loop of the strip material.

In an exemplary embodiment of a storage means according to the invention, each holding level comprises a plurality of lines of holding elements essentially horizontal in an operating position.

In another exemplary embodiment of a storage means according to the invention, a holding level comprises a plurality of holding elements ascending in an operating state from one end of the processing line to the center of this line and subsequently descending toward the other end of the processing line.

In an exemplary embodiment, the holding means contain spring supported holding elements carrying lateral edges of a strip material and accumulating it above the holding elements as long as the weight of the strip material is less than the threshold value. The holding elements are pressed laterally by the weight of the strip material against the force of the spring far enough to release the strip material downward if the threshold value is exceeded.

For example, each of the individual holding elements may comprise a flat spring-like, flexible support plate, on which a retaining mushroom is located to support the strip material. The head of these retaining mushrooms may be in the form of a spherical cup, with a radius of about 5 mm to about 150 mm, and preferably about 50 to 100 mm.

To set the "pre-tension" of such support plates and thereby also the threshold value for the weight of the strip material, an exemplary embodiment of the storage means is provided with a stop for the flexible support plate, against which one end of the support plate abuts under bending stress. Further, a spacer located at the other end, i.e. between the support plate and its mounting. The "pre-tension" of the support plate may thus be set readily.

If the storage means are to process strip material of different widths, the effective width of the internal space of the storage device must be variable. To make this possible, limiting devices are provided in an exemplary embodiment, which define two essentially flat planes. These planes extend approximately parallel to the lateral walls of the housing, thereby determining the effective width of the internal storage space into which the strip material is entering. On one of the limiting devices, holding elements are provided for the accumulation of the entering strip material. In order to render the effective width variable, the limiting devices may be moved toward or away from each other.

In an alternate exemplary embodiment, one of the limiting devices consists of a frame comprising cross-struts essentially parallel to the direction of movement of the strip material entering; the flexible plates carrying the holding mushrooms are fastened to said cross-struts.

If such a storage device is connected by stationary intersections with the preceding and following processing station, and if the effective width of the inner storage space must be altered because, for example, a strip material from the preceding processing station is of greater or lesser width and is entering the storage space, the effective width of the storage space must be variable without any great effort. In order to also take into consideration at the same time the stationary intersections, the limiting devices are displaceable together and symmetrically relative to a reference plane extending perpendicular to the plane of the strip material entering and parallel to its lateral edges, from inlet to outlet.

In a practical configuration of a storage means according to the invention, at least one motor driven threaded spindle is provided for displacement of the limiting devices, said spindle being provided toward one end (as viewed from the longitudinal center of the spindle), with a right hand thread and toward the other end with a left hand thread, with the right hand thread and the left hand thread having approximately the same pitch. The spindle engages a threaded bore hole in the limiting devices.

The threading of the strip material into the storage means should also be simple, rapid and reliable. In an exemplary embodiment, the storage means are equipped with a threading mechanism defining a channel from the inlet into the storage to the outlet of said storage.

One exemplary embodiment of the threading mechanism comprises pivoting guide plates, which in the pivoted state define the channel from the inlet into the storage space to the outlet from said space. In order to carry out a fully automatic and reliable threading process, a sensor is provided at both the inlet and the outlet, with the sensor at the inlet emitting a signal for the in-pivoting of the guide plates upon detecting the entry of the strip material. This signal is input to a drive for the pivoting of the guide plates. When the strip material is threaded in and is exiting from the outlet, the outlet sensor emits a signal to pivot the guide plate out.

To transport the strip material in the storage space, for example, transport rollers are provided both at the inlet into and the outlet from the storage space. However, by contacting these rollers, the strip material is frequently charged electrostatically. Because unintentional discharges can subsequently take place inside the storage space, under certain conditions the strip material may be unintentionally exposed or otherwise damaged. To prevent this, grounding is provided in an exemplary embodiment to remove electric charge from the strip material.

Another exemplary embodiment of a storage means further includes a fill stand indicator which discontinues feeding of strip material into the storage space if the quantity of strip material in the storage space exceeds a threshold value.

A storage device of the present invention is especially practical in an apparatus for processing strip material which includes at least two processing stations, with a storage device being inserted between the two processing stations.

A storage device of the present invention is also particularly suitable for use in photographic processing lines. Accordingly, a further object of the invention is a photographic processing line equipped with one or several storage means according to the invention. In such a processing line, initially in a film developing station the positive or negative films are developed. Subsequently, in a copy station the films are copied onto a strip of photosensitive paper. The exposed photographic paper is then developed in a paper developing station and finally in a terminal processing station, the components belonging to a customer order are assembled and packaged. In such photographic processing lines intermediate storage means are provided between the copy station and the paper developing station, which in a particularly advantageous manner is laid out as described above.

BRIEF DESCRIPTION OF THE DRAWINGS

These and other objects and advantages of the present invention will become more apparent from the following detailed description of preferred embodiments when read in conjunction with the accompanying drawings, wherein like elements are represented by like reference numerals and wherein.

DETAILED DESCRIPTION OF PREFERRED EMBODIMENTS

Figure 1:
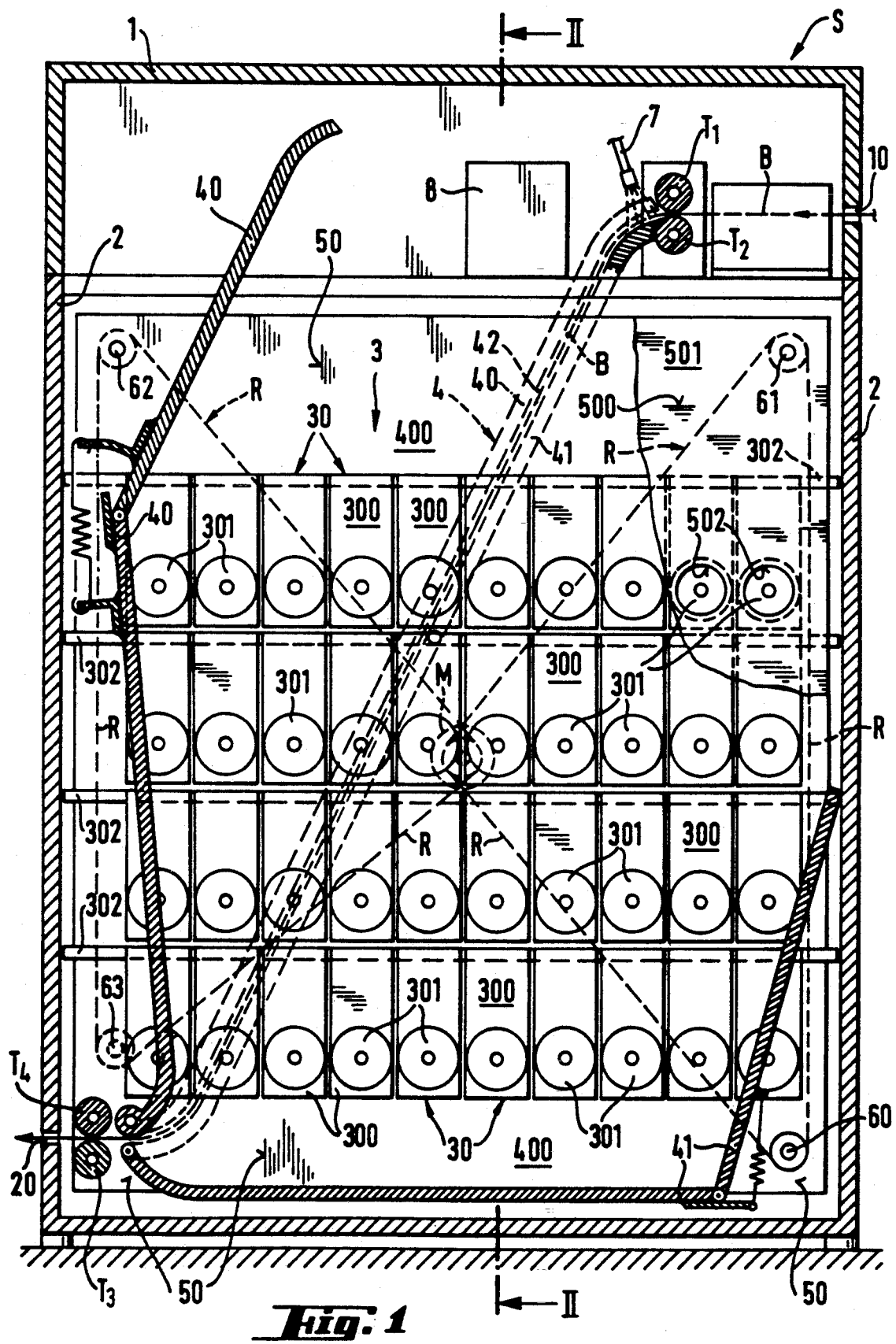
FIG. 1 shows a longitudinal section through an exemplary embodiment of a storage device according to the invention.

FIG. 1 shows a longitudinal section through an exemplary embodiment of a storage device S according to the invention. The FIG. 1 device includes a storage housing consisting of an upper part 1 and a lower part 2. In the upper part 1 of the housing an inlet 10 is provided, through which the strip material B may enter the internal space of the housing. In the lower part 2, a corresponding outlet 20 is present through which said strip material exits the inner space of the housing. Holding means 3 are further provided, which in this exemplary embodiment comprise a plurality of holding levels and individual holding elements 30 which are explained in detail below. For reasons of clarity the stage-wall or stage-plate 501, which is described below, is omitted here. In addition, transport rollers T1 and T2 are shown at the inlet 10 and transport rollers T3 and T4 are shown at the outlet 20 to transport the strip material B. A threading mechanism 4 is also shown to thread in the strip material B.

Figure 2:
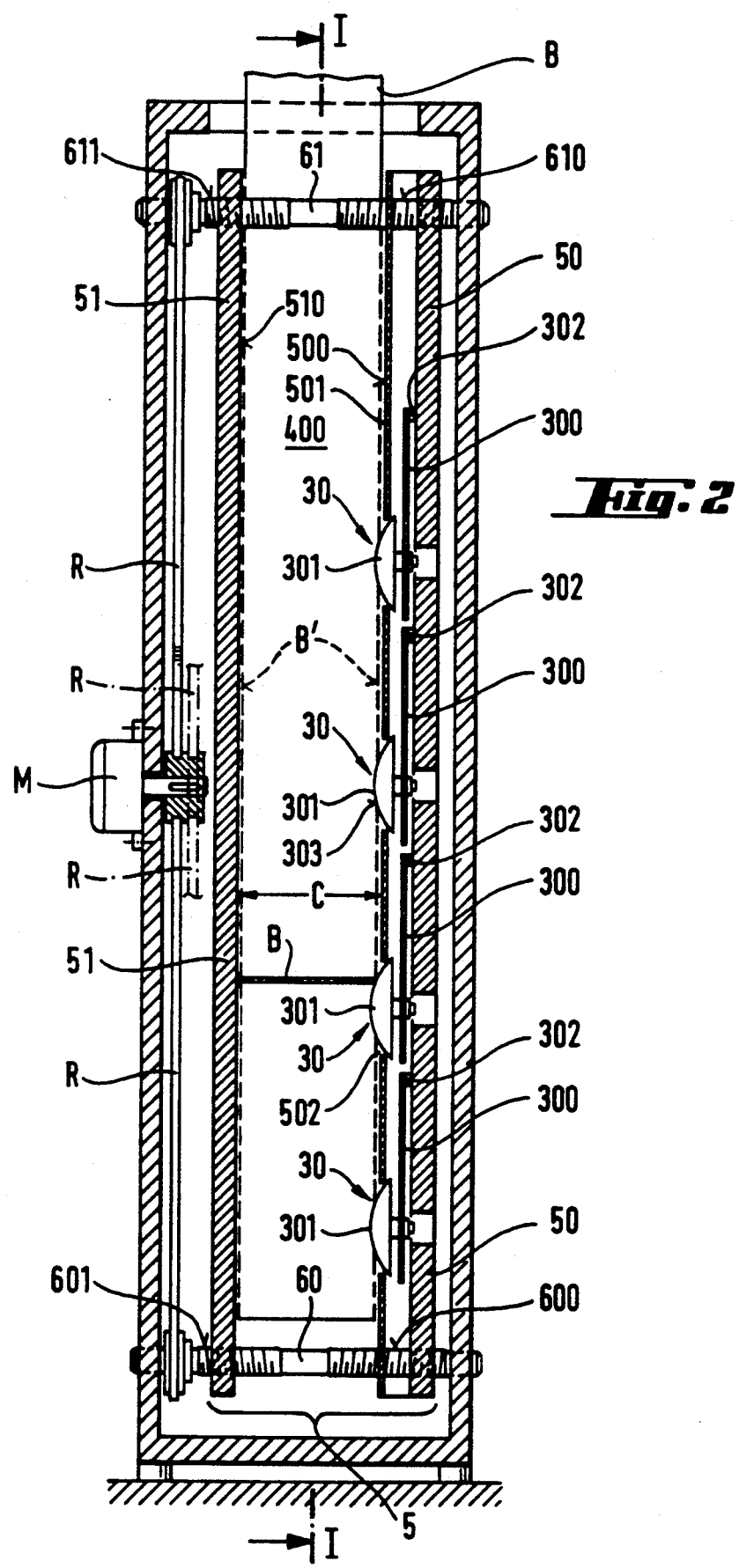
FIG. 2 shows a section of the line II—II of FIG. 1.

FIG. 2 shows a section through the storage means S on the line II—II of FIG. 1. For reasons of clarity, the upper part 1 of the housing has been omitted in this view, together with a few other details, as this figure is intended to illustrate the essential mode of operation of the holding means 3 (FIG. 1) and of the limiting devices 5, which determine the effective width of the inner storage space. As mentioned above, the holding means comprises a plurality of holding elements 30, which in this example, each comprise a flexible, flat spring-like support plate 300, with a holding mushroom 301 located on it. Each of the support plates 300 is connected by means of a spacer 302 (FIG. 3) with a first plate 50, so that the holding mushrooms 301 point to a second plate 51 (FIG. 2). The inner surface 500 of the wall of a stage-plate 501 which is located in front of the first plate 50, the surface 510 of the second plate 51 and the holding mushrooms 301 define the effective width of the internal storage space and thus the width of the strip material B (FIG. 1) to be processed. Openings 502 are provided in the plate 501, the diameters of which are smaller than that of the holding mushrooms 301, so that the latter may project through the wall into the inner space and together with the wall (i.e., inner surface 500), determine the effective width C of the internal storage space. In order to clearly illustrate this, the broken lines B' are indicated in FIG. 2; it is also intended to show that one edge of the strip material B is abutting against the inner surface 510 of the second plate 51 and the other edge is carried by the holding mushrooms 301. Persons skilled in the art will recognize immediately that the first plate 50 may alternately be formed as a frame equipped with cross-struts essentially parallel to the direction of the entering strip material and to which, by means of the spacer 302, the support plates 300 of the holding mushrooms 301 are fastened.

As seen in FIGS. 1 and 2, threaded spindles 60-63 are provided for the variation of the effective width C of the internal storage space 400. As shown in FIG. 2, the spindles (i.e., spindles 60, 61) are provided, as viewed from their longitudinal center, toward one end with a left hand thread 600, 610, and toward the other end with a right hand thread 601, 611. In the two plates 50 and 51 (or a frame) corresponding threaded bores are provided, which are engaged by the appropriate thread of the spindles. The pitch of the threads is approximately the same, so that common variation of the two plates 50 and 51 symmetrically relative to the longitudinal section plane II—II is possible. The spindles 60-63 may be driven, for example, by a drive motor M (FIG. 2) and one or several belts R (FIG. 1).

Figure 3:
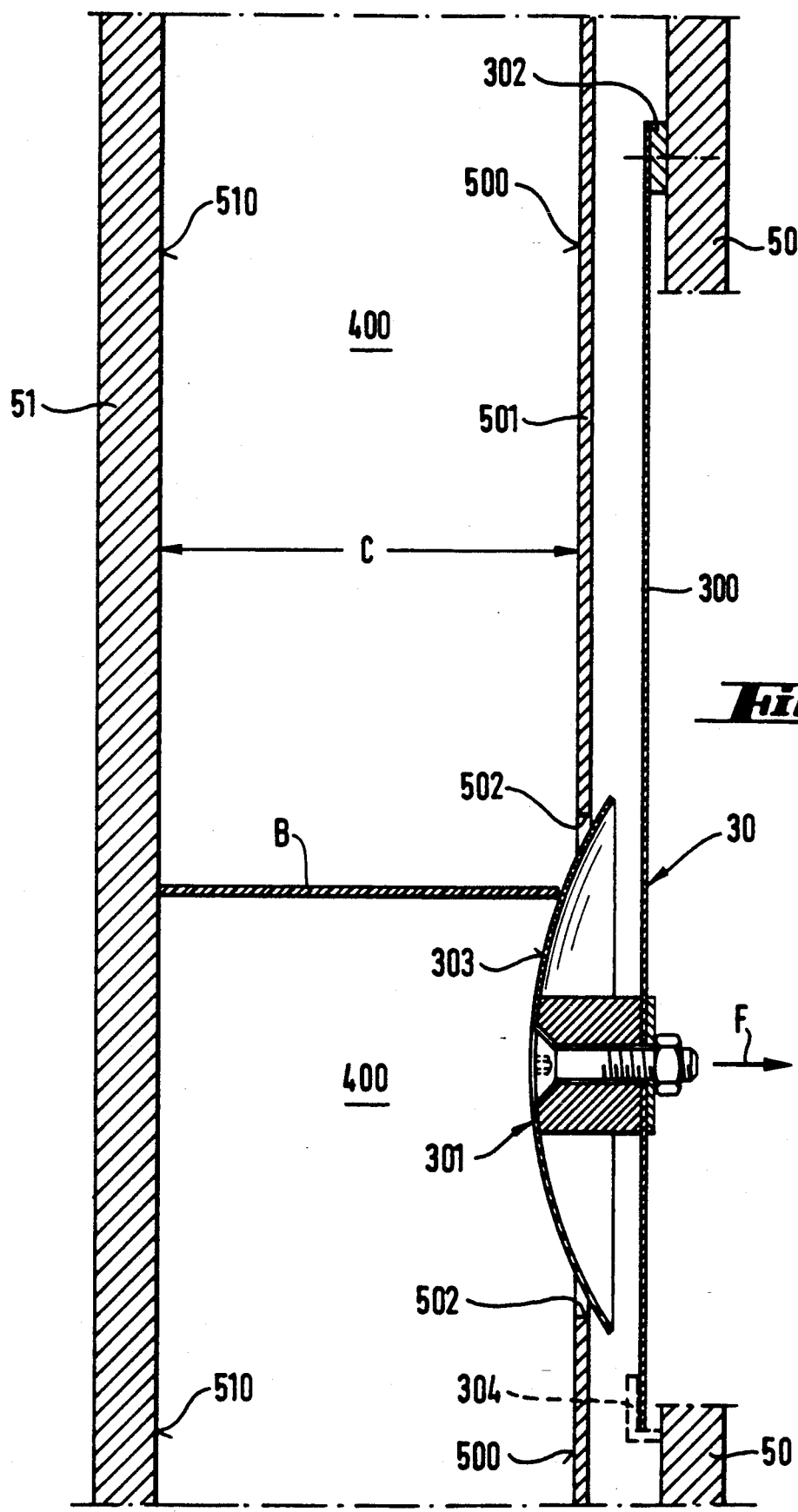
FIG. 3 shows a holding element of the exemplary embodiment illustrated in FIG. 1.

A single holding element 30 is shown enlarged in FIG. 3. The support plate 300 is fastened by means of the spacer 302 to the first plate 50 or to a cross-strut of a frame used in place of a plate. A holding mushroom 301 is mounted on the support plate 300, a head 303 of which consists of a spherical cup. The radius of the latter is within a range of 5 mm to 150 mm, and preferably from about 50 mm to about 100 mm. When an edge of the strip material B is resting from above on the holding mushroom 301 and the material is accumulating above it, the strip material depresses by its weight the flexible plate 300 against the spring force applied by the tension of the support plate. The depression occurs laterally outward in the direction of the arrow F. If a threshold value is exceeded, the support plate 300 is pressured back far enough to release the strip material in the downward direction.

FIG. 3 shows how in a simple manner the "pre-tension" of such a support plate 300 may be set, thereby varying the threshold value at which the strip material is released. For this purpose, a stop 304 may be provided (this is optional and is therefore indicated by a broken line only), against which the end of the support plate 300 abuts. By selecting the thickness of the spacer 302, the "pre-tension" and thus the threshold value at which the strip material is released, may be varied in a simple manner.

The threshold value may be set by the variation of the effective width C of the internal storage space 400. A reduction of the width results in an increase in the lateral deflection of the holding elements 30 and thus of the threshold value and vice versa. In this manner, the different weight of the paper strips of varying widths may be taken into account.

Figure 4A:
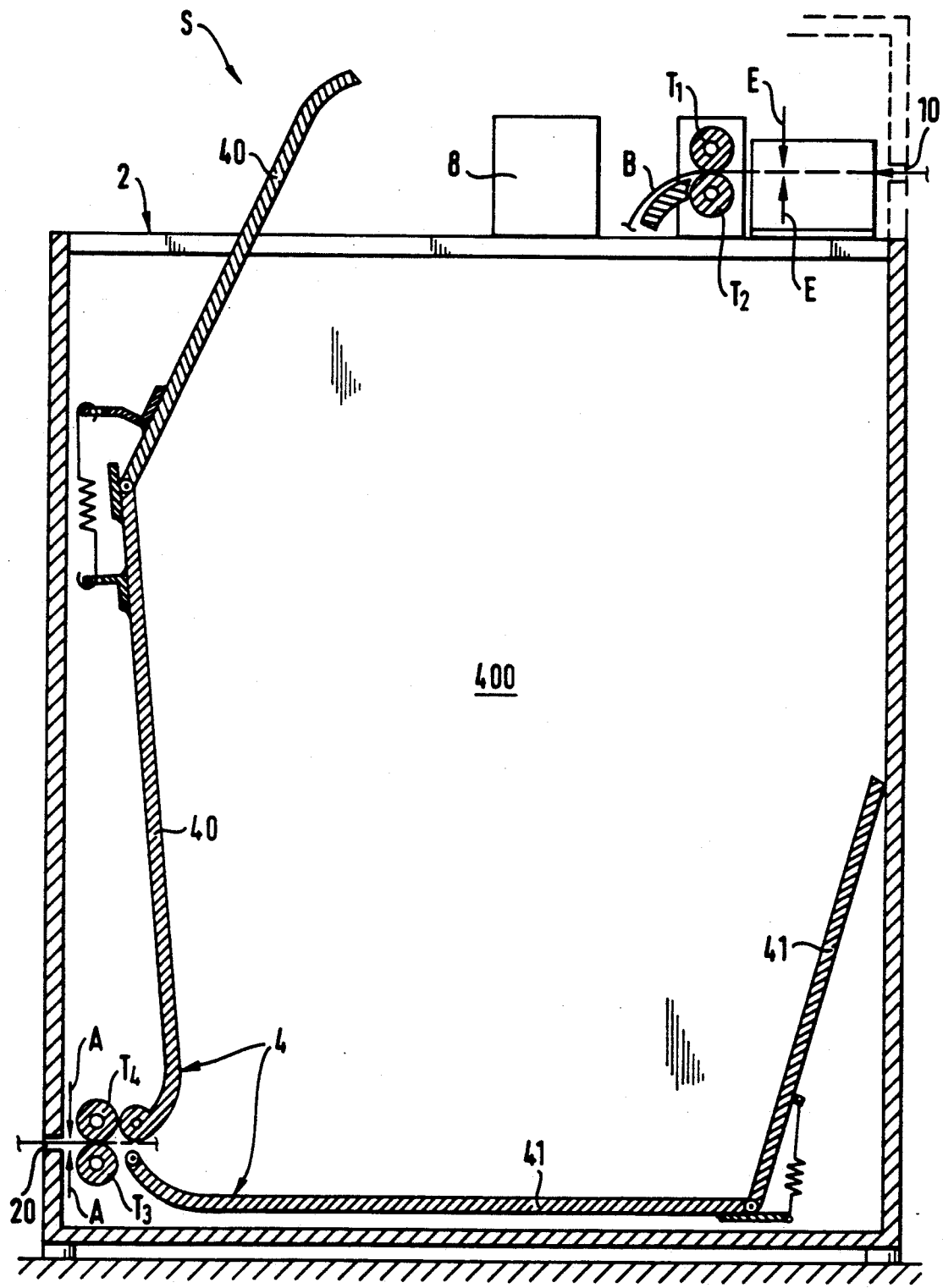
FIG. 4a shows an exemplary embodiment of a threading mechanism with pivoting guide plates in the out-pivoted state.
Figure 4B:
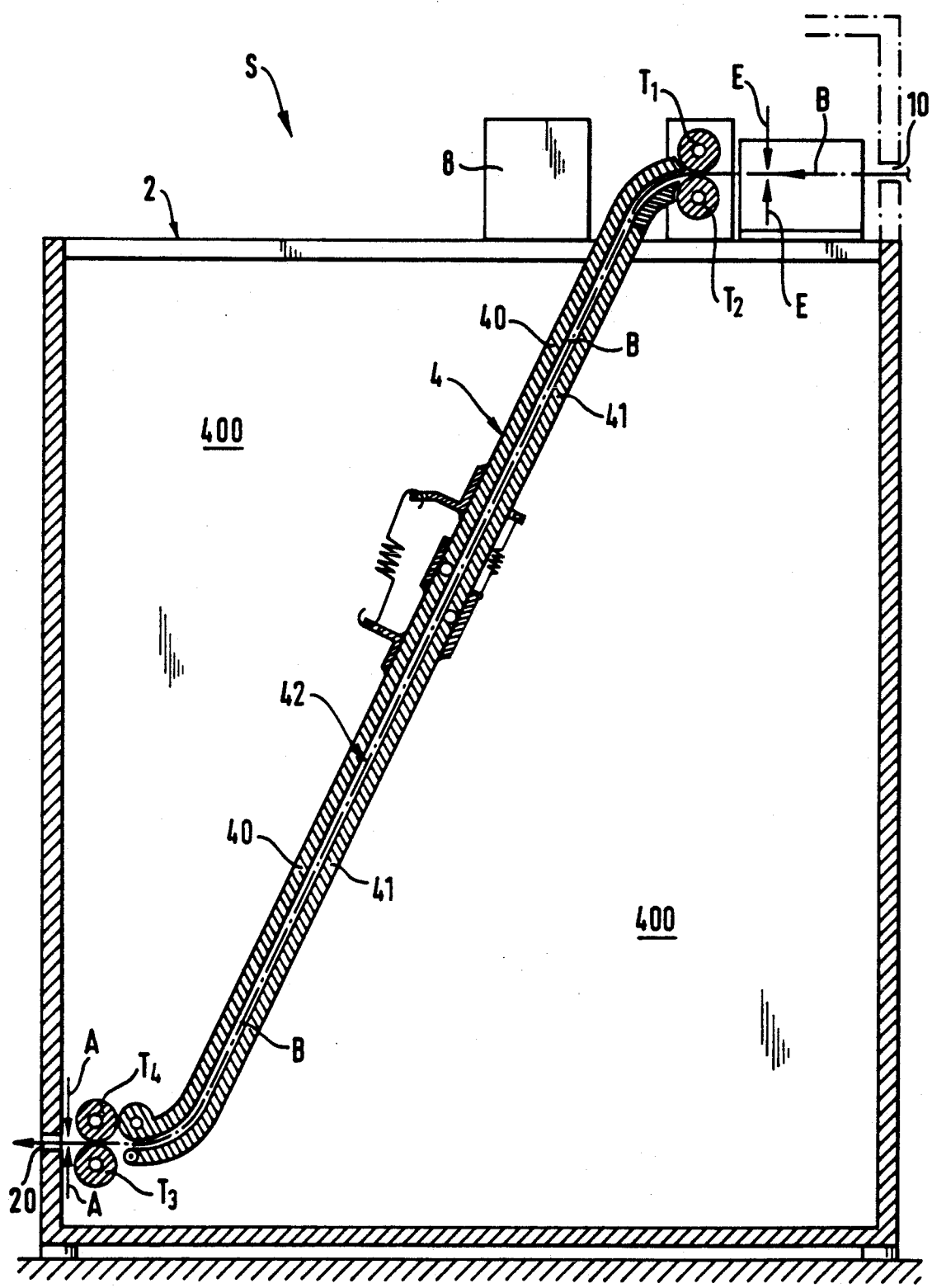
FIG. 4b shows the threading mechanism of FIG. 4a with guide plates in the in-pivoted state.

With reference to the following figures (FIG. 4 to FIG. 7) the mode of operation of the storage means will be explained in detail. At first, the threading apparatus and process will be explained with reference to FIG. 4 (FIG. 4a and 4b) and subsequently the accumulation and storage of the strip material itself will be explained. To explain the threading process, initially a storage device is considered to be in an unfilled state. In the view of FIG. 4, the upper part 1 of the housing as well as the holding elements 30 are again omitted for the sake of clarity.

FIG. 4a shows a two-part upper guide plate 40 and a two-part lower guide plate 41 in an outward pivoted state, in which they are largely in contact with the walls of the housing.

Upon its entering into the inner space of the housing, a sensor, for example an optical sensor, detects the strip material B (the detection of the material B entering by the sensor is indicated by the arrows E). The sensor then emits a signal to the drive (not shown) for the in and out pivoting of the guide plates 40 and 41, shown in the in position in FIG. 4b. In this state, the guide plates 40 and 41 define a channel 42 extending essentially from the inlet into the internal storage space 400 to the outlet from said space. In this channel 42 the strip material is guided during the threading process to the outlet, where a sensor again detects the existing strip material B (sensor detection indicated by the arrows A). The sensor the emits a signal for the outward pivoting of the guide plates 40 and 41 to the drive provided for the pivoting of the guide plates 40 and 41, whereby said guide plates are again pivoted into the state described with reference to FIG. 4a. The threading process is now complete. It is advantageous that the threading process can be carried out simply, rapidly and reliably with a relatively low mechanical effort.

Following the completion of the threading process, the strip material may now be stored in a storage means. Simultaneously, strip material may now be taken at any time at the outlet 20 of the storage space as needed, for example for further processing, as the strip material has been threaded in and thus is available at the outlet 20. Those skilled in the art will recognize immediately that the outlet 20 may be located farther up (for example if a processing station following the outlet 20 has its inlet higher up). In this case, it is merely necessary then to guide the strip material to said outlet.

Figure 5:
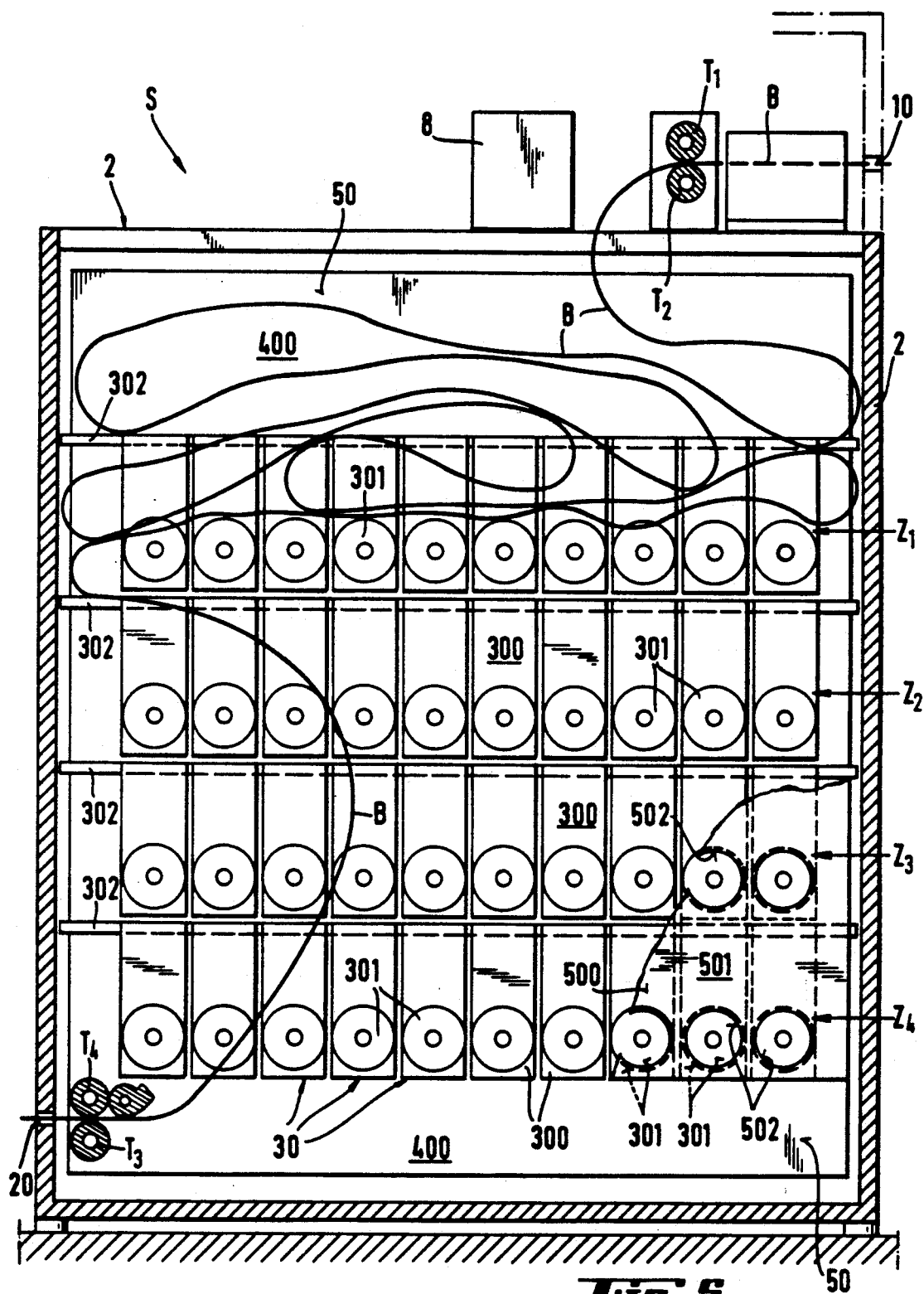
FIGS. 5-7 show a longitudinal section through the exemplary embodiment of FIG. 1 for different operating stages.

FIG. 5 and the two figures following it (FIG. 6 and 7), show how the strip material B is accumulated in the inner storage space. For the sake of clarity the upper part 1 of the housing etc. have again been omitted in these figures. In the exemplary embodiment described, the holding elements 30 are laid out along four holding levels represented as rows Z1–Z4 which are horizontal in their operating state. These rows of holding elements 30 define the individual holding levels upon which the strip material B is accumulated. As seen in FIG. 5, the holding elements 30 of the top row initially accumulate the strip material B in the form of loops over the row, until the weight of the accumulated strip material exceeds the threshold value and the holding elements 30 are pressured back against the spring force of the support plates 300 far enough so that the strip material is released in the downward direction.

Figure 6:
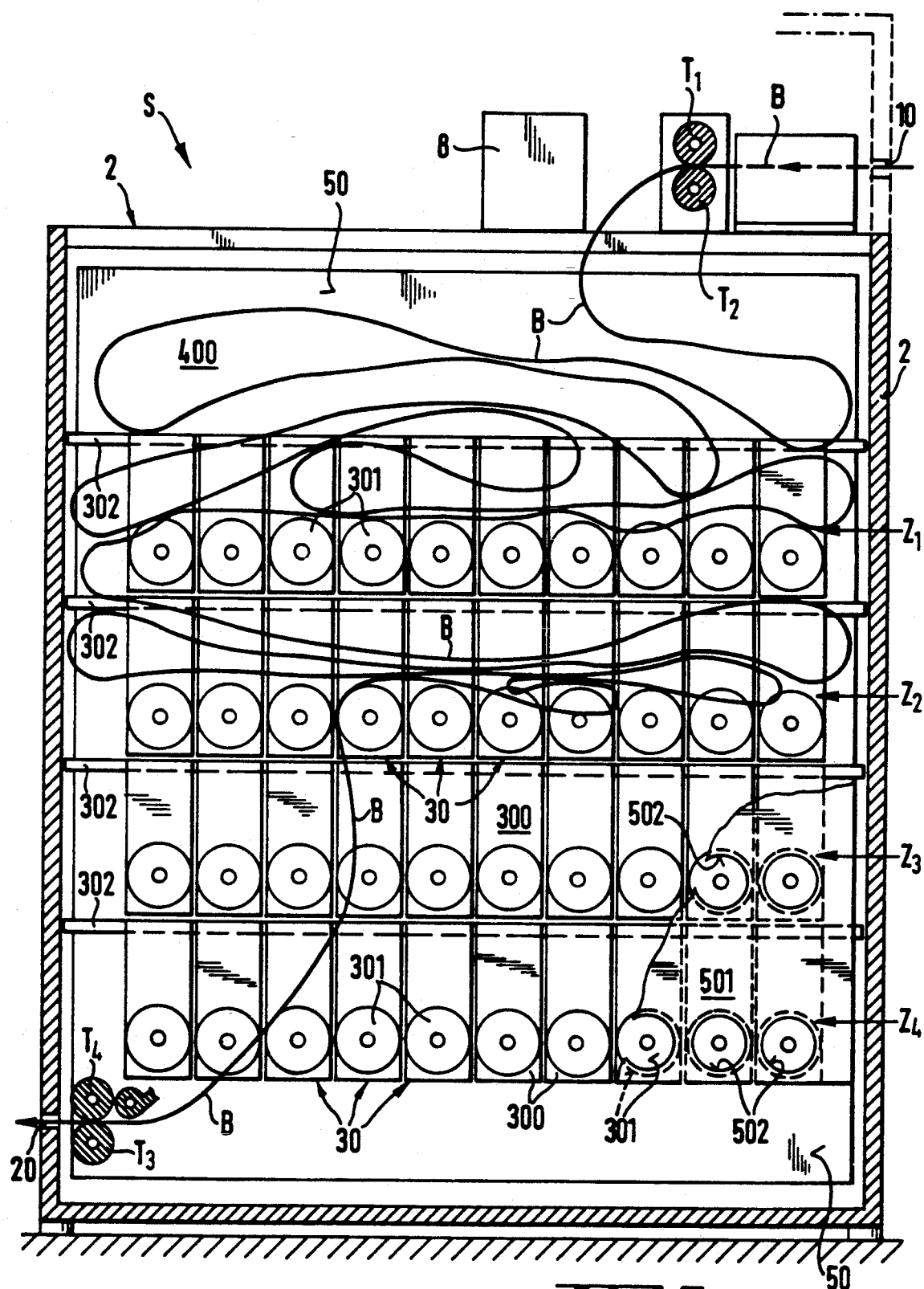
Figure 7:
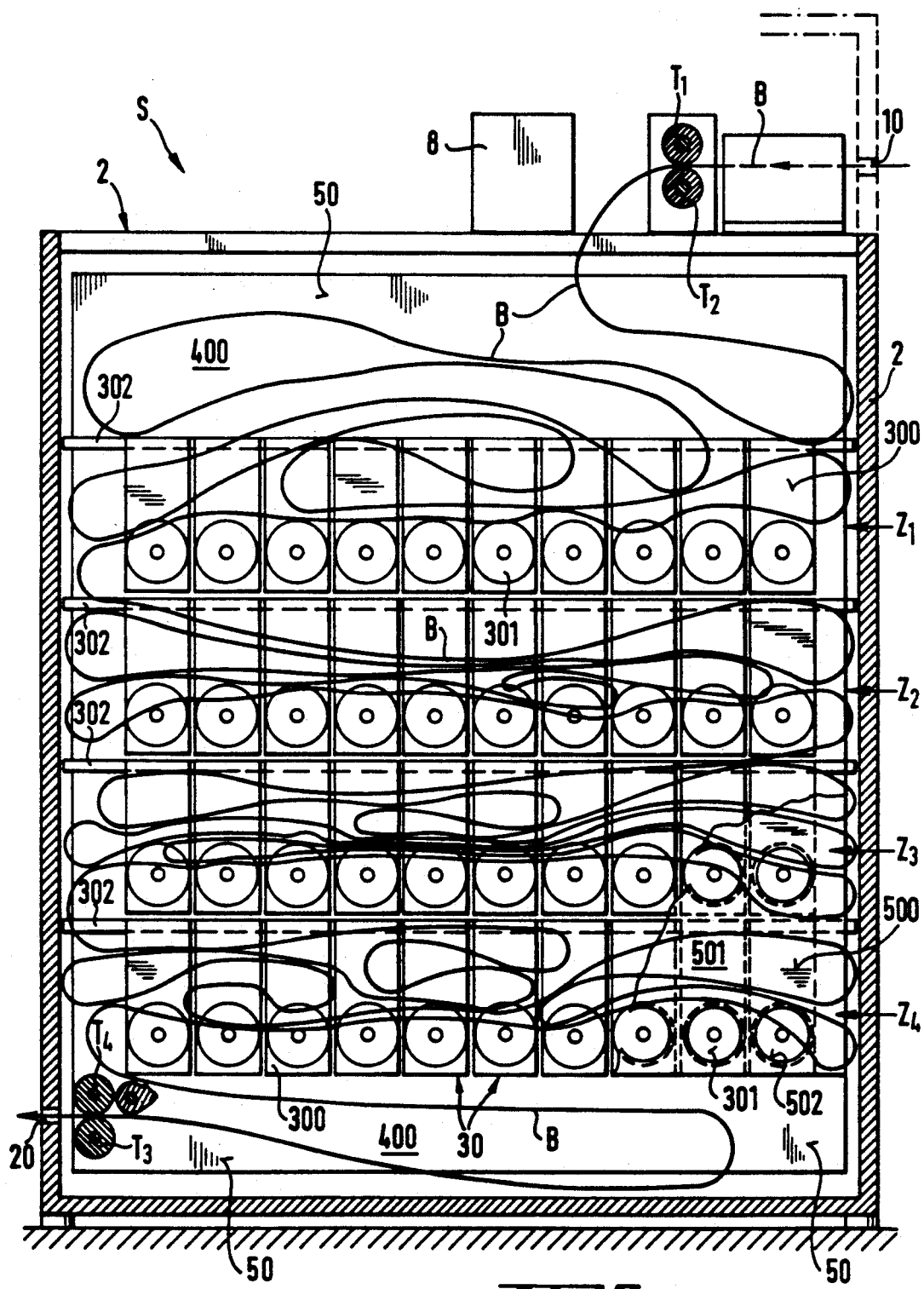

The resulting "state" of the inner storage space 400 is seen in FIG. 6. The threshold value of the top holding level has already been exceeded so that the strip material B has been released to the next level below and the holding elements of the second highest row are now accumulating the strip material released by the level above, until the threshold value is again exceeded. If by the release of the strip material to the next lower level the threshold value of the uppermost level is now not attained, the strip material entering the storage space is again accumulated until the threshold value is again exceeded and the strip material again released to the next lower level.

In a similar manner, the second highest level releases strip material to the third highest level below, i.e., to the third highest row Z3 of holding elements 30, whenever the threshold value of the second highest level is exceeded. The same is true for the release of strip material from the third highest to the fourth highest level Z4.

Storage means filled on all four levels are shown in FIG. 7, again for the sake of clarity without the upper part 1 of the housing etc.. It is seen that the threshold value of the fourth highest, i.e., the lowest holding level is set relative to the capacity of the fourth level so that only one loop of the strip material B will ever be located under said level. In this manner, for example, in the case of photographic paper as the strip material, unintentional pressure exposures of the photographic paper are prevented when the paper is being drawn out from the outlet 20 of the storage space. In addition, this further assures the safe withdrawal of the strip material from storage.

Figure 8:
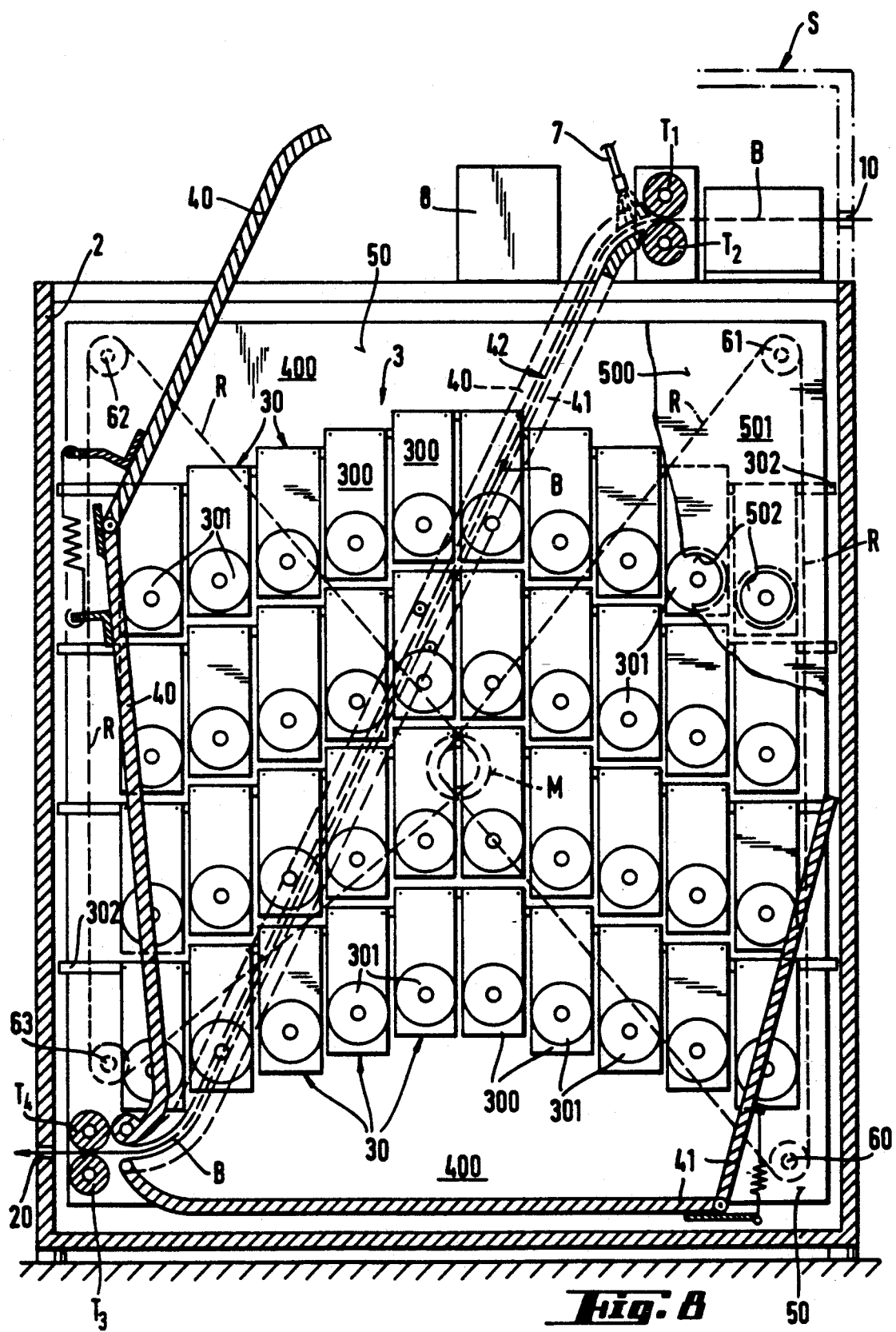
FIG. 8 shows a longitudinal section through another exemplary embodiment of a storage device according to the invention.

Another exemplary embodiment of a storage means according to the invention is shown in FIG. 8. Here, the holding elements 30 defining the holding levels are ascending from one end of a row to the center of the row and then descend toward the other end of the row. It is attained in this fashion that the strip material accumulates more uniformly as viewed along one row relative to the FIG. 7 example. In the FIG. 8 example, the strip material accumulates in the center of a row more densely, while at the ends of the row more "airy" loops are formed. Obviously, the different density observed along one row of the strip material can also be compensated by a suitable variation of the pre-tension of the holding elements 30 located in the center of the row. As explained above, this may be effected by means of the spacer 302.

The storage means described above may further comprise a grounding device for electric charges which may be generated, for example, by the friction of the strip material in contact with the transport rollers T1 to T4. They may be provided both at the inlet and the outlet of the storage space. In FIGS. 1 and 8, such a grounding device 7 is shown schematically as an ionization device only at the inlet 10. This grounding device may, for example, be in a form such that it ionizes the air between it and the strip material, thereby rendering the air conductive, so that the charge may flow to a charge sink also provided in the device 7 (for example a small grounded metal plate). This prevents the occurrence of discharges on the strip material (for example photographic paper) and thus of intended exposures.

A fill stand indicator 8 (FIGS. 1 and 8) may further be provided, which emits a corresponding signal when a certain fill stand is attained, thereby making it possible to effect certain timely measures prior to the complete filling of the storage space, for example, by inserting another storage device or the like.

Figure 9:
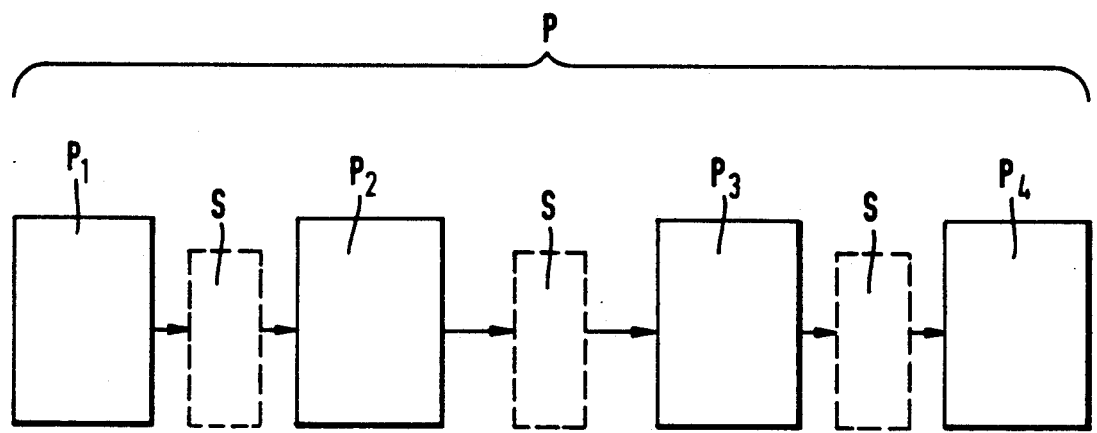
FIG. 9 shows a photographic processing line with a plurality of storage devices according to the invention.

A storage device S of the present invention is especially well suited for use in an installation for the processing of strip material and in particular in a photographic processing line P such as shown in FIG. 9 in a block diagram. The FIG. 9 processing line comprises a plurality of individual processing stations. In a film developing station P1, initially positive or negative films are developed. Subsequently, in a copy station P2 the positive or negative films are copied onto a strip of photosensitive paper, which is then developed in a paper developing station P3. In a subsequent final processing station P4, the components (i.e., negative and copied prints) belonging to a customer order are collected prior to their return to the customer. Storage means S may be inserted between the individual processing stations as discussed in the introduction and indicated by broken lines in FIG. 9. At least however, a storage means S is inserted between the copy station P2 and the paper developing station P3 which advantageously is laid out in the manner described above with reference to the figures. Such storage means S are relatively simple in their configuration, which is highly advantageous in view of cost considerations. Furthermore, it is not necessary to run "blind" strips through the storage space as the threading process may be effected as simply as possible and also rapidly and safely. Another highly important advantage is the very low space requirements of a storage means S according to the invention (compared to known storage devices), while providing a high strip material receiving capacity, which is particularly advantageous in view of the processing lines that are becoming more and more concerned with space savings. The exemplary storage means described above are obviously also suitable for the storage of film material.

It will be appreciated that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description, and all the changes that come within the meaning and range and equivalents, thereof are intended to be embraced therein.

What is claimed is:

1. Apparatus for storing strip material comprising: a housing having an inlet for receiving strip material entering into the internal space of said apparatus and an outlet from which the strip material exists out of the internal space of said apparatus; holding means in said internal space for accumulating the entering strip material above said holding means when a weight of the accumulated strip material entering said internal space is below a threshold value, and for releasing the strip material in a downward direction when the weight of the strip material accumulated above said holding means exceeds said threshold value.

2. Apparatus according to claim 1, wherein the holding means further comprises: a plurality of holding levels with each successive holding level being located below a preceding holding level such that in operation, the strip material accumulates in a given level and is released from the given level to a next lower level when the weight of the strip material exceeds a threshold value for the given level, the strip material being released onto successive lower levels as the threshold value for each level is exceeded.

3. Apparatus according to claim 2, wherein the holding means further comprises: a lowest holding level where the threshold value for the weight of the strip material is set so that underneath said lowest level essentially only one loop of the strip material can accumulate.

4. Apparatus according to claim 3, wherein the holding means further comprises: a plurality of rows of holding elements essentially horizontal in an operating position and defining the plurality of holding levels.

5. Apparatus according to claim 3, wherein the holding means further comprises: a plurality of rows of holding elements, with holding elements in each row ascending in an operating position from one row end toward a center of the row and subsequently descending toward an opposite end of the row, said holding elements defining the plurality of holding levels.

6. Apparatus according to claim 3, wherein the holding means further comprises: spring supported holding elements for supporting lateral edges of the strip material and for accumulating said strip material above the holding elements when the weight of the strip material is below a threshold value of the spring supported holding element, the holding elements being laterally pressured back against a spring force far enough so that when the threshold value is exceeded, the holding elements release the strip material downward.

7. Apparatus according to claim 6, wherein each of the holding elements further comprises: a flat spring like support plate, upon which a holding mushroom is mounted to support the strip material.

8. Apparatus according to claim 7, wherein the holding mushroom further includes: a mushroom head formed as a spherical cup with a spherical radius of about 5 mm to 150 mm.

9. Apparatus according to claim 8, wherein the spherical radius is between 50 mm and 100 mm.

10. Apparatus according to claim 7 further comprising: a stop for the support plate against which one end of the support plate abuts in a resilient manner; and a spacer provided at an opposite end of the support plate, between the support plate and a mounting plate, for setting a prestressing level of the support plate.

11. Apparatus according to claim 7, wherein the holding means further comprises: limiting devices which include two essentially horizontal surfaces extending approximately parallel to lateral walls of the housing to determine an effective width of the internal space into which the strip material enters, said limiting devices being movable toward each other or away from each other.

12. Apparatus according to claim 11, wherein one of the limiting devices further includes: a frame having cross-struts essentially parallel to a direction of motion of the entering strip material, with the support plates carrying the holding mushrooms being fastened to said cross-struts.

13. Apparatus according to claim 12, wherein the limiting devices may be displaced together and symmetrically relative to a reference plane extending perpendicularly to a plane of the entering strip material and parallel to lateral edges of the entering strip material, from inlet to outlet.

14. Apparatus according to claim 13, further comprising: at least one motor driven threaded spindle for moving the limiting devices, said spindle having a right hand thread located toward one end of the spindle as viewed from a longitudinal center of the spindle, and having a left hand thread with a pitch approximately identical to a pitch of said right hand thread located at an opposite end of the spindle, said spindle engaging a threaded bore in each of the limiting devices.

15. Apparatus according to claim 3 further comprising: a threading mechanism for the strip material which defines a channel from the inlet of the internal space to the outlet of said internal space during a threading operation of the strip material.

16. Apparatus according to claim 15, wherein the threading mechanism further comprises: pivoting guide plates which, in a pivoted-in position, define the channel from the inlet of the internal space to the outlet of said internal space.

17. Apparatus according to claim 16, further comprising: an inlet sensor provided at the inlet and an outlet sensor provided at the outlet, such that during a threading process the inlet sensor emits a signal to a drive for inward pivoting of the guide plates upon detecting entry of the strip material into the housing, and the outlet sensor emits a signal to pivot the guide plates outward upon detecting exit of strip material.

18. Apparatus according to claim 3, further comprising: a discharge device to remove electrical charges from the strip material at the inlet and outlet.

19. Apparatus according to claim 3, further comprising: a fill stand indicator to discontinue feeding of strip material into the internal if a quantity of the strip material in the internal space exceeds a threshold value.

20. Apparatus for processing strip material with at least two processing stations comprising: storage means inserted between said processing stations for storing the strip material, the storage means further including: a housing having an inlet for receiving strip material entering into an internal space of the housing and an outlet from which the strip material exits out of the internal space of the housing; holding means in the internal space of the housing for accumulating the entering strip material above said holding means when a weight of the accumulated strip material entering the internal space is below a threshold value, and for releasing the strip material in a downward direction when the weight of the strip material accumulated above said holding means exceeds said threshold value.

21. A photographic processing line comprising: a film developing station for developing positive or negative films; a copy station to expose the positive or negative films onto a photosensitive photographic paper strip; a paper developing station for developing the exposed paper strip; a final processing station for packaging the films and the developed paper strip; and an intermediate storage means between the copy station and the paper developing station, the intermediate storage means storing the exposed strip of paper between the copy station and the paper developing station and including: a housing having an inlet for receiving strip material entering into an internal space of the housing and an outlet from which the strip material exits out of the internal space of the housing; holding means in the internal space of the housing for accumulating the entering strip material above said holding means when a weight of the accumulated strip material entering the internal space is below a threshold value, and for releasing the strip material in a downward direction when the weight of the strip material accumulated above said holding means exceeds said threshold value.

* * * * *